US008158178B2

(12) United States Patent
Knikker et al.

(10) Patent No.: US 8,158,178 B2
(45) Date of Patent: Apr. 17, 2012

(54) METHOD FOR REMOVING ODOR FROM VINEGAR

(75) Inventors: Dirk A. Knikker, Nieuw Lekkerland (NL); René J. C. Notebaart, Gorinchem (NL); Diana Visser, Gorinchem (NL)

(73) Assignee: Purac Biochem B.V., AC Gorinchem (NL)

( * ) Notice: Subject to any disclaimer, the term of this patent is extended or adjusted under 35 U.S.C. 154(b) by 984 days.

(21) Appl. No.: 12/155,517

(22) Filed: Jun. 5, 2008

(65) Prior Publication Data

US 2008/0305228 A1    Dec. 11, 2008

(30) Foreign Application Priority Data

Jun. 7, 2007  (EP) .................................. 07109815

(51) Int. Cl.
*C12J 1/00*    (2006.01)
(52) U.S. Cl. ....................................... 426/422; 426/650
(58) Field of Classification Search .................. 426/650, 426/422, 17, 487, 486
See application file for complete search history.

(56) References Cited

U.S. PATENT DOCUMENTS

| 4,765,997 A | 8/1988 | Tominaga |
| 4,897,272 A | 1/1990 | Kubota et al. |

FOREIGN PATENT DOCUMENTS

| JP | A-60-137281 | 7/1985 |
| JP | A-01-312990 | 12/1989 |
| JP | A-02-211859 | 8/1990 |
| JP | A-03-123480 | 5/1991 |
| JP | 07075543 A * | 3/1995 |
| JP | A-07-075543 | 3/1995 |
| WO | WO 2007/035244 A1 | 3/2007 |

OTHER PUBLICATIONS

M.L. Morales et al. "Evaluation of Aroma Compounds in Wine Vinegars: Effect of previous Neutralization of Samples". Food Science and Technology International, vol. 9, No. 6, 2003, pp. 397-402.*
Carpi, Anthony Ph. D. "Acids and Bases: An Introduction". Visionlearning vol. CHE-2 (2), 2003, 3 pages. http://www.visionlearning.com/library/module_viewer/php?mid=58.*
Chemical Land. "Sodium Acetate". Mar. 18, 2006, 2 pages. http://web.archive.org/web/20060318033846/http://www.chemical-land21/com/industrialchem/organic/SODIUM%20ACETATE.htm.*
Chen, Y. "What is Vinegar?" Wise Geek, May 20, 2007, 2 pages. http://web.archive.org/web/20070520095232/http://www.wisegeek.com/what-is-vinegar.htm.*
Kissner. "Citric Acid". Dec. 15, 2007, 3 pages. http://web.archive.org/web/20071215120806/http://www.kissner.com/citric-acid.html.*
Burdock, George A. "Sodium Lactate". Encyclopedia of Food and Color Additives, vol. 3, 1997, p. 2566.*
M.L. Morales et al; "Evaluation of Aroma Compounds In Wine Vinegars: Effect of Previous Neutralization of Samples", *Food Science and Technology International*; vol. 9, No. 6, 2003, pp. 397-402.

* cited by examiner

*Primary Examiner* — D. Lawrence Tarazano
*Assistant Examiner* — Stephanie Cox
(74) *Attorney, Agent, or Firm* — Oliff & Berridge, PLC

(57) ABSTRACT

The invention relates to a method for removing odor from vinegar comprising:
a) increasing the pH of the vinegar with base to at least 6;
b) maintaining said pH for at least 15 minutes at 40-90° C.;
c) adding acid to obtain vinegar having pH between 6 and 8, if the pH of the vinegar of step b) is 8 or higher.

12 Claims, No Drawings

METHOD FOR REMOVING ODOR FROM VINEGAR

The invention pertains to a method for removing odor from vinegar.

Vinegar is a blend of acids comprising acetic acid. A recurrent problem of vinegar is its glue/solvent-like odor, which is attributed to the presence of ethyl acetate, which is an impurity that is naturally present in vinegar. Ethyl acetate is formed by esterification of acetic acid and ethanol which both are present in vinegar obtained from fermentation processes.

Various methods have been proposed for the removal of ethyl acetate from vinegar. In JP 7075543 raw vinegar having a temperature of 40-70° C. was brought into contact with a gaseous phase reduced into an atmospheric pressure of 60-160 mmHg to remove volatile substances.

In JP 3123480 vinegar originating from cereals, fruits and/or sugars was brought into contact with a nonionic porous synthetic adsorbent, thereby adsorbing and removing ill-odor substances existing in the vinegar. This method was not primarily aimed at the removal of ethyl acetate, but at the removal of isovaleric acid and phenylacetic acid.

In JP 60137281 the vinegar having ill odor and taste was blasted with steam pressurized to a pressure sufficient to cause the elimination of the ill-odor.

In U.S. Pat. No. 4,765,997 a method of controlling the odor of vinegar has been disclosed by using a dehydrating sheet comprising semi-permeable external membranes and a highly osmotic substance sealed there between, which is immersed in the vinegar for absorbing and removing the unwanted odor-emitting substances contained in them.

M. L. Morales and A. M. Troncoso in Food Sci. Techn. Int., 9 (6), 397 (2003) describe a study dealing with the effect of neutralization of vinegar as pretreatment step for analysis purposes. The vinegar was neutralized up to pH 6 at room temperature with magnesium oxide and/or sodium hydroxide, after which acetic acid was added to restore the original pH value, which is about pH 2-3.

It was found that these methods insufficiently remove ill-odor products. Although these methods may seem effective in removing the odor, it was found that the bad odor recurred after standing for a while.

It is therefore an object of the present invention to provide a method that permanently removes ill-odor products from vinegar, and wherein the treated vinegar remains without ill-odor also after long standing. The latter is of importance because vinegar is sold for treating meat or for making dressings, and the vinegar can be shelved for several months prior to its use.

Such improved method for removing odor and maintaining taste from vinegar was now found and comprises:
a) increasing the pH of the vinegar with base to at least 6;
b) maintaining said pH for at least 15 minutes at 40-90° C.;
c) adding acid to obtain vinegar having pH between 6 and 8, if the pH of the vinegar of step b) is 8 or higher.

In step a) the pH is increased with base. In principle any base can be used, but alkali metal base is preferred, particularly potassium or sodium hydroxide. Mixtures of bases can also be used. The pH is increased to at least 6, but for increasing the reaction rate a pH of at least 8, preferably at least 9.5 is favored. Typically, pH of about 10 has been found very suitable and effective.

An important additive contribution to the process may be the evaporation of at least part of the volatile constituents during or after step b). These constituents may be ethyl acetate, but other volatile ill-odor products such as isovaleric acid and phenyl acetic acid are removed as well. The evaporation is not necessary but can further improve the process. Evaporation already occurs at room temperature, but this needs relatively long process times. If quicker methods are preferred the vinegar is preferably heated to 40-90° C., more preferably to 50-80° C., which is sufficiently high to evaporate ethyl acetate, possibly as an azeotropic mixture with water, and low enough to prevent deterioration of the vinegar. Alternatively, evaporation is performed under reduced pressure to speed up the process. Typically, a standing time of about 1 hour at 60° C. is sufficient to fully remove ethyl acetate. Shorter times up to 15 minutes are possible, particularly when using higher temperatures. When using lower temperatures usually longer times are required. At 40° C. a standing time of 2 hours is usually sufficient to fully remove the odor. It is generally not necessary to apply standing times longer than 24 hours, but longer standing times do not harm the process. The evaporation process, if applied, can be supported by stirring the vinegar and/or distilling the volatile products. It was found that these steps including alkalization and evaporation are sufficient to permanently remove ethyl acetate and traces ethanol, the latter of which could lead to formation of ethyl acetate with acetic acid. After these steps to remove the ill-odor compounds, the vinegar is brought again to acidic or neutral pH by adding acid, if the vinegar has a pH higher than 8. Commonly this step is performed after cooling the vinegar to about room temperature, if elevated temperatures were used during the standing and/or evaporation. Acids can be added such as malic acid, acetic acid, propionic acid, citric acid, tartaric acid, and lactic acid. Adding hydroxy acids is preferred, and lactic acid, citric acid, or mixtures thereof have the greatest preference. The pH is thereby brought to below pH 8, typically to about pH 6 to 8 to obtain so-called neutralized vinegar, which is used as antibacterial agent in the meat industry. The method of the invention has in addition to the permanent removal of ill-odor constituents the advantage that the good vinegar taste is maintained.

In another preferred embodiment the method comprises adding lactate ion. This can be done prior or during step a). This addition can also be done after step a) but in that case the lactate ion does not contribute to the removal of ill-odor. The lactate ion may be added as sodium, ammonium, or potassium lactate, or as a mixture thereof. Most preferably potassium lactate or sodium lactate, or a mixture thereof is added. It can further be of advantage when in addition thereto also sodium and/or potassium hydroxide are added to the vinegar, particularly to bring the pH to the desired value.

In another embodiment the above method can be combined with any one the prior art methods, such as purging the vinegar with air or steam, or treating the vinegar with an adsorbent or membrane. The method of this invention provides vinegar that is stable, which means that ethyl acetate is not longer formed under the neutral conditions during shelving.

The invention is further illustrated by the following non-limitative examples.

EXAMPLE 1 (ACCORDING TO PRIOR ART)

Samples based on commercially available normal vinegar and on commercially available vinegar from which ethyl acetate was removed by the manufacturer (marketed as flavorless vinegar) were evaluated. The composition of the samples comprising a mixture of potassium lactate and commercially available vinegar is given in Table 1. The samples were prepared as follows:

A beaker glass was filled with potassium lactate (PURASAL® HiPure P Plus, ex Purac) at room temperature and under stirring the vinegar and demineralized water were added. Potassium hydroxide solution was added under stirring and the pH was directly measured at room temperature. The pH was thereafter determined for a 10% water solution by taking 16.7 g of the sample and adding demineralized water to 100 gram, and measuring at room temperature. The samples were stored in glass jars and kept in a refrigerator at 0-5° C.

TABLE 1

| Sample | Vinegar source | KLa (%)[1] | AcA (%)[2] | pH direct | pH[3] |
|---|---|---|---|---|---|
| I | White distilled (ex Fleischmann) | 57 | 3.4 | 7.4 | 6.0 |
| II | Crystal select (ex Fleischmann) | 56 | 3.4 | 6.6 | 5.3 |

[1]KLa = potassium lactate
[2]AcA = Acetic acid
[3]pH measured as a 10% water solution The samples were used undiluted for odor evaluation at room temperature. Samples were judged for odor by six trained panelists judges. The results are given in Table 2.

TABLE 2

| Sample | Descriptions |
|---|---|
| I | Solvent, glue, red wine, vinegar |
| II | Solvent, glue, red wine, vinegar, musty |

Mixtures based on normal vinegar and on so-marketed flavorless vinegar not having undergone the method of the present invention have almost the same odor profile (solvent, glue, vinegar).

EXAMPLE 2

Samples according the invention and comparison samples were evaluated. The composition of the samples comprising a mixture of vinegar and potassium lactate is given in Table 3.

Sample III according to the invention was prepared as follows: A beaker glass was filled with 68 g of potassium lactate (PURASAL® HiPure P Plus, ex Purac) at room temperature and under stirring 11 g of vinegar (White distilled 300 grain; ex Fleischmann) and 12 mL of demineralized water were added. 6 g of an aqueous 50% potassium hydroxide solution was added under stirring until a pH of 9.5 was reached (directly measured). The solution was heated to 60° C. and kept at this temperature for one hour while stirring. The solution was cooled to room temperature. Lactic acid (PURAC FCC 80, ex Purac) was added until a pH of 6.7 was reached. The samples were stored in glass jars and kept in a refrigerator at 0-5° C.

Sample IV is a blend of potassium lactate and normal vinegar, which was prepared as follows:

A beaker glass was filled with 72 g of potassium lactate (PURASAL® HiPure P Plus, ex Purac) at room temperature and under stirring 11 g of vinegar (White distilled; ex Fleischmann) and 13 mL of demineralized water were added. 3 g of a 50% aqueous potassium hydroxide solution were added under stirring and the pH was directly measured at room temperature and found to be 6.7. The pH was thereafter determined for a 10% water solution by taking 16.7 g of the sample and adding demineralized water to 100 grams, and measuring at room temperature. The samples were stored in glass jars and kept in a refrigerator at 0-5° C.

TABLE 3

| Sample | KLa (%)[1] | AcA (%)[2] | pH direct | pH[3] | EtAc[4] (ppm) | EtOH[5] (ppm) |
|---|---|---|---|---|---|---|
| III | 56* | 3.4* | 6.8 | 5.2 | <5 | <10 |
| IV | 57 | 3.3 | 6.7 | 5.3 | 100-500 | 450 |

[1]KLa = potassium lactate
[2]AcA = Acetic acid
[3]pH measured as a 10% water solution
[4]EtAc = Ethyl acetate
[5]EtOH = Ethanol
*calculated values Sample III according to the invention was not found by the sensory panelists to have the disliking solvent/glue-like smell of Sample IV. Analysis further showed that nearly all ethyl acetate and ethanol were removed from Sample III in contrast to sample IV which contained commercially available vinegar and was not treated according to the method of the present invention.

The invention claimed is:

1. A method for removing odor from vinegar comprising:
   a) increasing a pH of the vinegar with base to at least 6;
   b) maintaining said pH for at least 15 minutes at 40-90° C.; and
   c) adding acid to obtain vinegar having a pH of between 6 and 8, if the pH of the vinegar of step b) is 8 or higher.

2. The method according to claim 1 wherein at least part of volatile constituents of the vinegar is evaporated during or after step b).

3. The method according to claim 1 wherein in step a) the pH is increased to at least 8.

4. The method according to claim 1 wherein in step b) the vinegar is maintained at said pH for at least 30 minutes.

5. The method according to claim 1 wherein in step b) the temperature is maintained at 50-80° C.

6. The method according to claim 1 wherein in step a) the pH is increased using potassium and/or sodium hydroxide.

7. The method according to claim 1 wherein in step c) a hydroxy acid is added to adjust the pH to between 6 and 8.

8. The method according to claim 7, wherein the hydroxy acid is lactic acid, citric acid, or a mixture thereof.

9. The method according to claim 1 wherein the vinegar is mixed in or prior to step a) with lactate ion.

10. The method according to claim 9 wherein the vinegar is mixed with potassium lactate and/or sodium lactate.

11. The method according to claim 1, wherein in step a) the pH is increased to at least 9.5.

12. The method according to claim 1, wherein in step b) the vinegar is maintained at said pH for at least 60 minutes.

* * * * *